United States Patent Office 2,834,682
Patented May 13, 1958

2,834,682
METHOD OF MAKING FOAMED PEANUT BUTTER

Paul Zuckerman, Detroit, Mich., assignor to Sunshine Biscuits, Inc., Long Island City, N. Y., a corporation of New York No Drawing. Application June 15, 1955
Serial No. 515,779

4 Claims. (Cl. 99—128)

This invention relates to peanut butter and processes for making same, and in particular to foamed or whipped butter in which a predetermined amount of air or other inert gas is admixed.

Various methods and formulas have been proposed in the past for foamed or whipped peanut butter, but these have failed to produce a satisfactory product, in the preparation of whipped peanut butter according to this invention, and in the product derived therefrom, it is an object to provide a stable whipped butter which will be easily spreadable, will have and retain proper color characteristics, will resist rancidity and will remain stable both as to oil separation and escape of air.

It has been found, according to the invention, that in order to manufacture the improved whipped peanut butter the roasted and ground peanuts should preferably undergo a continuous flow process during which it is subjected to two separate and sequential mixing operations. In the first of these operations the ground peanuts are mixed in conventional quantities with a known stabilizer containing highly hydrogenated oil while the mass is cooled to a temperature of approximately 90–100° F. The mass is then conducted to a second mixing apparatus in which it is subjected to thorough whipping of a substantially higher intensity than that of the first mixer, while a continuous supply of an inert gas such as nitrogen is fed to the mixing chamber. During this intense whipping, the temperature of the mass is kept constant or is allowed to rise only a few degrees. During the whipping operation, the pressure in the mixing chamber is maintained within a specified range, namely, between 30–40 p. s. i. The rate of flow of inert gas to the mixing chamber is such that the final foamed product contains a predetermined amount of gas which has been found to produce ideal spreading and taste qualities. In particular, the amount of gas in the final product is held at between approximately 12% to 19% by volume of the total volume of the whipped product. The butter can then be packed directly from the whipping operation into suitable containers, where it is allowed to cool under room temperature conditions.

Peanut butter containing less than about 12% by volume of entrapped gas was found not to possess the easy spreadability which was characteristic of butter having entrapped gas within the critical range, but instead had the spreading properties of ordinary peanut butter. When the amount by volume of entrapped gas exceeded about 19%, the size of the gas bubbles was found to vary considerably, with bubbles of relatively large size scattered throughout the mass. Peanut butter in this category had an unsuitable appearance because of irregularities formed by these large bubbles. The irregularities made it difficult to pack the peanut butter properly in glass containers to uniform levels. Moreover, these irregularities impaired the spreadability of the product, making it difficult to be spread evenly over a bread slice or similar food surface.

The following examples show the principles of the improved method and product and also illustrate several control experiments by which the limitations of the invention are defined.

*Example I*

A large batch of blanched runner peanuts (about 400–500 pounds) were placed in a mill and a quantity of a known peanut butter stabilizing compound was added in the quantity of 6% by weight, which is the percentage recommended by the manufacturer of the stabilizer. The stabilizing compound in this case was Fix-M, manufactured by Proctor and Gamble Company and consisting essentially of ordinary peanut oil, hydrogenated peanut oil and salt in the approximate ratio of 4:1:1. The peanuts and stabilizer were ground in a mill and were then passed into a first mixer in which the comminuted mass was mixed and cooled. The mixer used for this purpose was a machine marketed under the trademark "Votator" and manufactured by the Girdler Corporation, Louisville, Kentucky. The mass entered this first mixer at a temperature of 140° F. and was cooled during mixing to a temperature of 100° F., at which temperature it left the mixer. No air or other gas was added to the mass during this first mixing operation.

The mass was then fed to a second mixing machine which whipped the mass with a substantially higher intensity than that of the first mixing operation. The machine used for the second mixer was an Oakes continuous automatic mixer, manufactured by the E. T. Oakes Corporation, Islip, Long Island, New York. The temperature of entrance into the second mixer was 92° F., and the pressure in this mixer was maintained at 38 p. s. i. The mass was fed continuously through both mixers at a rate of 30 pounds per minute, and left the second or high speed mixer at a temperature of 102° F. The temperature of the mass within the second mixer was held between its entrance and exit temperatures by a cooling jacket on the mixing head. Nitrogen was fed into the second mixer at the rate of two liters per minute (at a pressure of 120 p. s. i. above atmospheric). The peanut butter flowing from the second mixer was packed into jars, a continuous flow of peanut butter being maintained through both mixers.

The whipped peanut butter was found to flow smoothly from the second or high speed mixer into the containers, without the escape of any free nitrogen to the atmosphere. This peanut butter showed a fine whipped texture with tiny entrapped nitrogen bubbles. The spreadability of the peanut butter was excellent, and the color was slightly lighter than that of ordinary peanut butter. Since the butter flowed evenly from the second mixer into the containers it could be easily packed. By weighing the containers, it was found that a jar which normally held 32 ounces of peanut butter, held 27 ounces of whipped peanut butter, which meant that the entrained gas occupied about 15.5% by volume of the container. Storage of the whipped butter for six weeks at an average temperature of 75° F. resulted in no appreciable rancidity, separation of oil or settling due to escape of entrapped nitrogen.

*Example II*

The comminuted mass of peanuts and stabilizer were fed through the two mixers as previously, with the same entrance and exit temperatures for both mixers and the same pressure maintained in the second mixer. The rate of flow of nitrogen was gradually increased. When a rate of flow of three liters per minute was exceeded, large bubbles of free nitrogen began to escape from the exit of the second mixer, and the flow of whipped peanut butter from this mixer became erratic. The peanut butter in the containers, when examined, was found to contain large bubbles of entrained nitrogen which gave the mass an irregular appearance. Spreadability was impaired by this irregularity and the presence of the large bubbles of gas. By weighing the containers, it was found that a jar which normally held 32 ounces of peanut butter held 25¾ ounces of this butter, so that the amount by volume of entrapped gas was about 19.5%.

*Example III*

The test of Example I was repeated, but the flow of nitrogen to the second or high speed mixer was reduced until it fell below a rate of 1.7 liters per minute. Upon weighing the containers it was found that a jar which held 32 ounces of ordinary peanut butter held 28½ ounces of this butter, so that the amount by volume of entrapped gas was about 11.7%. The butter was heavier and substantially more difficult to spread than the foamed butter of Example I, having a spreadability very close to that of ordinary peanut butter.

*Example IV*

The test of Example I was repeated, but the valve at the exit of the second mixer was partially closed. This raised the pressure in the second mixer to about 42 p. s. i. and caused a drop in the rate of flow of nitrogen to 1.5 liters per minute (at 120 p. s. i.). The rate of flow of peanut butter through both the first mixer and the second or high speed mixer remained the same as previously, about 30 pounds per minute. Upon weighing containers filled with this butter, it was found that jars which contained 32 ounces of ordinary peanut butter held 30–31 ounces of this butter, indicating that the amount of entrapped gas by volume was between 3% and 6%. The peanut butter of Example IV was found to have spreadability characteristics which were substantially the same as ordinary peanut butter.

*Example V*

The text of Example I was repeated but the valve at the exit of the second mixer was partially opened until the pressure in the second or high speed mixer dropped to about 28 p. s. i. The flow of nitrogen into the second mixer, which was controlled by a reducing valve between the supply tank and mixer, remained constant at about 2 liters per minute. The flow of peanut butter through this system also remained constant at about 30 pounds per minute. Large bubbles of free nitrogen began to escape from the mixer exit making the flow of butter erratic, so that packing was difficult. The entrapped gas in the butter consisted of bubbles of greatly varying size, with many large nitrogen bubbles scattered throughout the mass. Due to this irregular appearance uniform filling of the containers was quite difficult. The large nitrogen bubbles also tended to produce uneven spreading of the peanut butter on bread slices. Weighing of the containers indicated that jars which held 32 ounces of ordinary peanut butter contained 30–31 ounces of this butter, thus indicating an amount of entrapped gas by volume of about 3% and 6%.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A process for making foamed peanut butter, comprising the steps of grinding an admixture of peanuts and a stabilizing agent at a temperature substantially above 100° F., mixing said ground peanuts and stabilizing agent while cooling the same to a temperature of about 90–100° F., whipping the mixture at a substantially higher intensity than that of said first mixing step and at a pressure of about 30–40 p. s. i. while maintaining the temperature of the mass below about 100° F., and simultaneously feeding an inert gas into the mass at a predetermined rate so that the resulting foamed peanut butter will have about 12–19% by volume of entrapped gas.

2. A process for making foamed peanut butter, comprising the steps of grinding an admixture of peanuts and a stabilizing agent at a temperature substantially above 100° F., causing the mixture to flow continuously at a predetermined rate through first and second mixers in series, mixing and cooling said ground peanuts and stabilizing agent in said first mixer to a temperature of about 90–100° F., whipping the mixture in said second mixer at a pressure of about 30–40 p. s. i., said second mixer operating at a substantially higher intensity than that of said first mixer, and simultaneously feeding an inert gas into said second mixer at a predetermined rate so that the resulting foamed butter will have about 12–19% by volume of entrapped gas.

3. A process for making foamed peanut butter, comprising the steps of grinding an admixture of peanuts and a stabilizing agent at a temperature substantially higher than 100° F., causing the mixture to flow continuously at a predetermined rate through first and second mixers in series, mixing and cooling said ground peanuts and stabilizing agent in said first mixer to a temperature of about 90–100° F., whipping the mixture in said second mixer at a pressure of about 30–40 p. s. i. while maintaining the temperature below 100° F., said second mixer operating at a substantially higher intensity than said first mixer, and simultaneously feeding nitrogen into said second mixer at a predetermined rate so that the resulting foamed butter will have about 12–19% by volume of entrapped gas.

4. A process for making foamed peanut butter, comprising the steps of grinding an admixture of peanuts and a stabilizing agent at a temperature substantially above 100° F., mixing said ground peanuts and stabilizing agent while cooling the same to a temperature of about 90–100° F., whipping the mixture at a substantially higher intensity than that of said first mixing step and at a pressure of about 30–40 p. s. i. while maintaining the temperature of the mass below about 100° F., and simultaneously feeding an inert gas into the mass at a predetermined rate to produce a peanut butter having a foamy consistency.

References Cited in the file of this patent

UNITED STATES PATENTS

| | | |
|---|---|---|
| 1,664,775 | Epstein et al. | Apr. 3, 1928 |
| 1,921,275 | Werner | Aug. 8, 1933 |
| 1,949,791 | Epstein et al. | Mar. 6, 1934 |
| 2,302,574 | Richardson et al. | Nov. 17, 1942 |